US011052669B2

(12) United States Patent
Jeran et al.

(10) Patent No.: US 11,052,669 B2
(45) Date of Patent: Jul. 6, 2021

(54) INTEGRATED CIRCUIT DEVICE FOR A REPLACEABLE PRINTER COMPONENT

(71) Applicant: Hewlett-Packard Development Company, L.P., Spring, TX (US)

(72) Inventors: Paul Jeran, Boise, ID (US); Bartley Mark Hirst, Boise, ID (US); Jefferson P Ward, Vancouver, WA (US); Dee Chou, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/644,607

(22) PCT Filed: Oct. 18, 2017

(86) PCT No.: PCT/US2017/057086
§ 371 (c)(1),
(2) Date: Mar. 5, 2020

(87) PCT Pub. No.: WO2019/078832
PCT Pub. Date: Apr. 25, 2019

(65) Prior Publication Data
US 2021/0060963 A1    Mar. 4, 2021

(51) Int. Cl.
*B41J 2/175*    (2006.01)
(52) U.S. Cl.
CPC ......... *B41J 2/17546* (2013.01); *B41J 2/1753* (2013.01)
(58) Field of Classification Search
CPC .............. B41J 2/17546; B41J 2/1753

USPC ........................................... 347/6
See application file for complete search history.

(56) References Cited

U.S. PATENT DOCUMENTS

| 6,745,331 | B1  | 6/2004  | Silverbrook |
| 7,551,859 | B2  | 6/2009  | Miller et al. |
| 8,188,860 | B2  | 5/2012  | Haid |
| 2002/0154915 | A1 | 10/2002 | Bullock et al. |
| 2004/0155913 | A1* | 8/2004 | Kosugi ............... B41J 2/17546 347/6 |
| 2006/0274125 | A1 | 12/2006 | Jacobsen et al. |
| 2010/0153729 | A1 | 6/2010  | Walmsley et al. |

(Continued)

FOREIGN PATENT DOCUMENTS

| CN | 101968840 A | 2/2011 |
| CN | 102651689 A | 8/2012 |
| CN | 105683843 A | 6/2016 |

(Continued)

OTHER PUBLICATIONS

Bazzazi et al., Trojan Counteraction in Hardware: a Survey and New Taxonomy, Indian Journal of Science & Tech. May 2016, vol. 9(18).

*Primary Examiner* — Huan H Tran
*Assistant Examiner* — Alexander D Shenderov
(74) *Attorney, Agent, or Firm* — Jefferson IP Law, LLP

(57) ABSTRACT

In one example, an article for a replaceable printer component includes an integrated circuit device having a device controller, a conductor to supply power to the device controller and to carry a signal to and from the device controller, and a sensor operatively connected to the device controller to sense a voltage and/or a frequency on the conductor. The device controller to send an indication of a sensed voltage and/or a sensed frequency to the printer controller.

20 Claims, 7 Drawing Sheets

(56) References Cited

U.S. PATENT DOCUMENTS

2011/0292102 A1* 12/2011 Asauchi .............. B41J 2/17546
　　　　　　　　　　　　　　　　　　　　　347/5
2017/0046540 A1　2/2017 Bytheway

FOREIGN PATENT DOCUMENTS

| CN | 107257737 A | 10/2017 |
| EP | 1 253 552 A1 | 10/2002 |
| EP | 1 777 535 A2 | 4/2007 |
| WO | WO-2015/030812 A1 | 3/2015 |
| WO | WO-2016/171694 A1 | 10/2016 |

* cited by examiner

INTEGRATED CIRCUIT DEVICE FOR A REPLACEABLE PRINTER COMPONENT

BACKGROUND

In many printers toner, ink and other printing materials are contained in removable cartridges that may be replaced periodically, for example when the printing material is fully consumed. Printing material cartridges may include an integrated circuit device (IC) that enables the exchange of information between a cartridge and the printer controller while the cartridge is installed in a printer.

DRAWINGS

The same part numbers designate the same or similar parts throughout the figures.

DESCRIPTION

To help deter the use of improper or counterfeit ink, toner and other printing material cartridges, the cartridges may include an integrated circuit device that enables the cartridge to communicate authentication and other information to the printer. Unfortunately, it has become increasing difficult to protect such information from unauthorized access and use.

A new technique has been developed to help authenticate printing material cartridges using the power supply voltage and signal frequency supplied by the printer to communicate with a chip on the cartridge. In one example, the printer controller manipulates the supply voltage and/or the signal frequency. The IC device on an authentic cartridge includes circuitry to sense the manipulation and programming to report sensing results to the printer controller. If the IC device does not report, or reports incorrect results, then the printer controller may determine that the cartridge is not authentic.

Examples are not limited to printing material cartridges. Examples may be implemented for other replaceable printing components including, for example, photoconductors, fusers and transfer belts in laser printers, build material supplies and fusing agent containers in 3D printers, and titration cassettes and biological or pharmaceutical material reservoirs in microfluidic digital dispensing devices.

The examples described herein illustrate but do not limit the scope of the patent, which is defined in the Claims following this Description.

As used in this document, "and/or" means one or more of the connected things; a "printer" means any digital printing device or microfluidic dispensing system including, for example, laser printers, inkjet printers and other digital microfluidic dispensing devices, and 3D printers; and a "memory" means any non-transitory tangible medium that can embody, contain, store, or maintain information and instructions for use by a processor and may include, for example, circuits, integrated circuits, ASICs (application specific integrated circuits), hard drives, random access memory (RAM), read-only memory (ROM), and flash memory.

Figure 1:
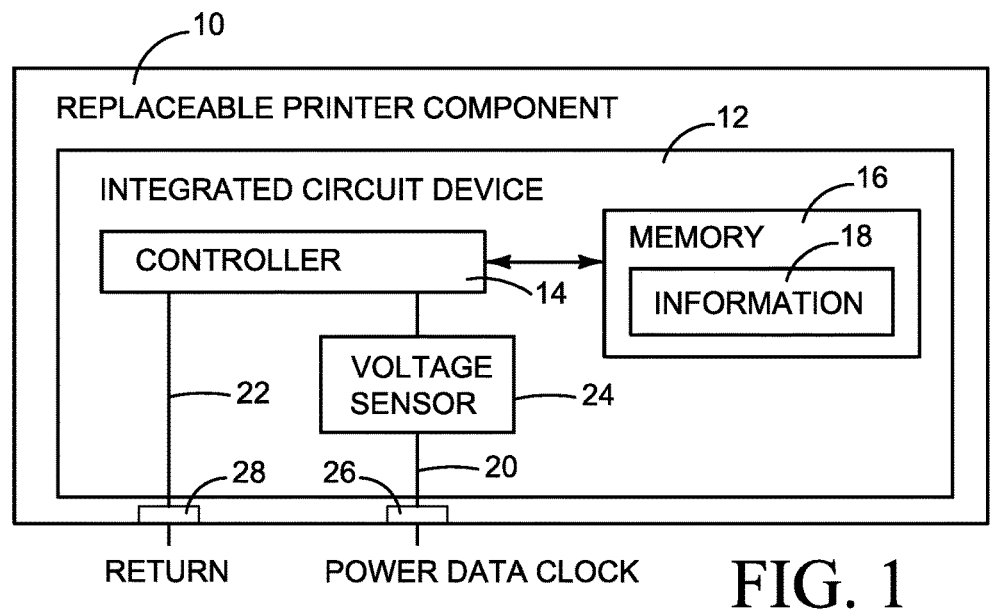
FIG. 1 is a block diagram illustrating a printing material cartridge or other replaceable printer component implementing one example of an integrated circuit device to communicate with a printer controller while the component is installed in a printer.

FIG. 1 is a block diagram illustrating a printing material cartridge or other replaceable printer component 10 implementing one example of an integrated circuit device 12 to communicate with a printer controller while the component is installed in a printer. Referring to FIG. 1, integrated circuit device 12 includes a controller 14, a memory 16 connected to controller 14 to store and/or generate information 18 about component 10, and conductors 20, 22 to supply power to controller 14 and the other elements of integrated circuit device 12, and to carry data and clock signals to and from device controller 14. In this example, conductors 20, 22 are implemented as a single pair of conductors to connect to a printer controller through a two conductor bus, with a power and signal conductor 20 and a return conductor 22. Other suitable conductor implementations are possible, including three conductor and four conductor configurations.

Integrated circuit device 12 also includes a voltage sensor 24 to measure or otherwise sense a voltage applied to signal conductor 20 and return conductor 22. Electrical contacts 26, 28 are connected to conductors 20, 22, respectively, to connect integrated circuit device 12 to a printer controller through a two conductor bus while component 12 is installed in a printer. Although sensor 24 is depicted as a discrete element in FIG. 1, separate from device controller 14, detector 24 could be integral to controller 14, for example as part of the same integrated circuit.

Device controller 14 represents the programming, processing and associated memory resources, and the other electronic circuitry and components to control data storage and retrieval to and from device 12, and any programming functions associated with device 12. Controller 14 may be implemented, for example, as a general purpose computer or a microcontroller configured to receive commands, data and requests for information from a printer controller and to act on those commands and requests to store information in memory 16, and retrieve information from memory 16. Although memory 16 is depicted as a discrete element in FIG. 1, separate from controller 14, memory 16 could be integral to controller 14, for example as part of the same integrated circuit. Also, while replaceable component 10 includes one IC device 12 in FIG. 1, more than one IC device 12 could be used to implement the desired functionality.

Figure 2:
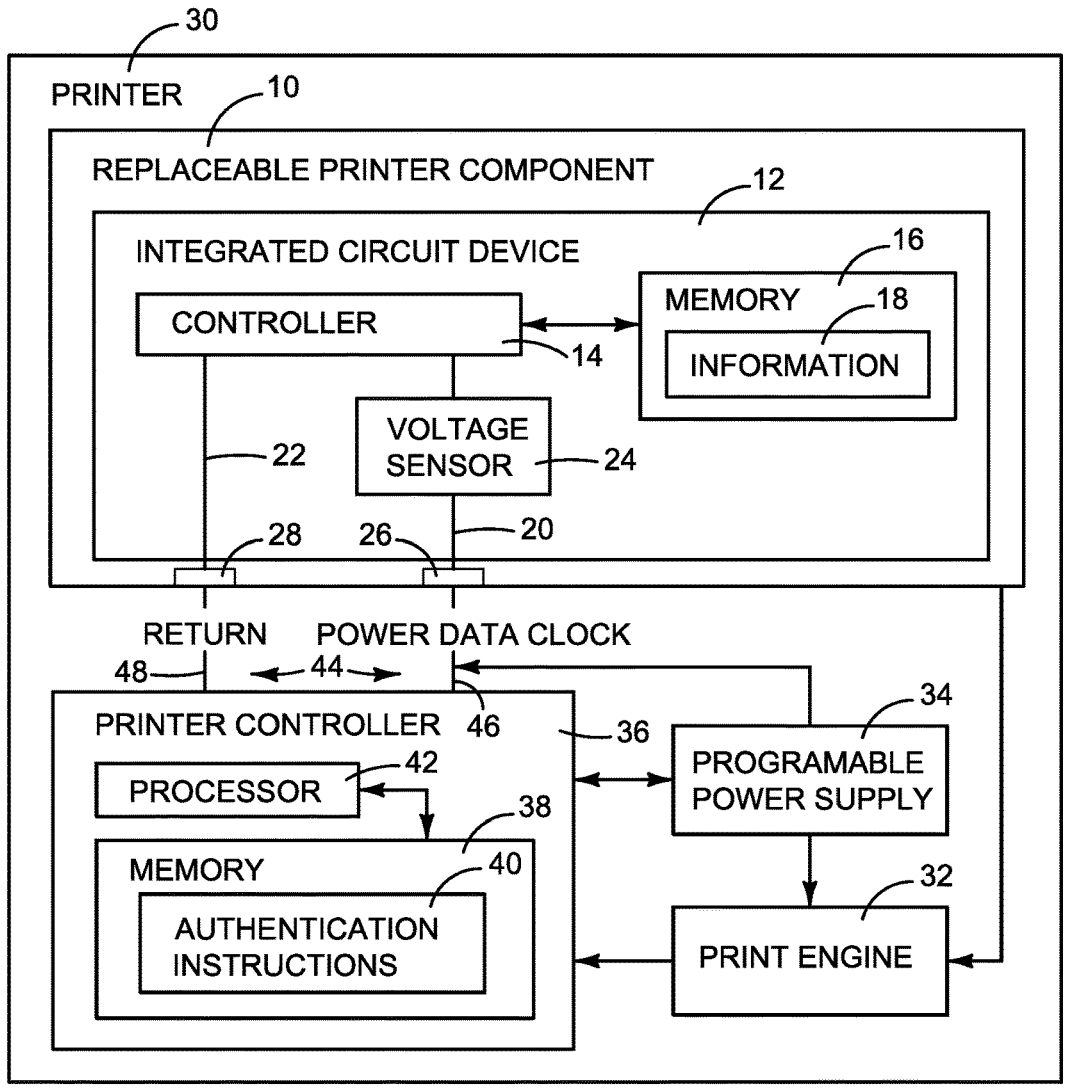
FIG. 2 is a block diagram illustrating a printer implementing one example of a communications system for communications between the printer controller and a replaceable printer component such as the component shown in FIG. 1.

FIG. 2 is a block diagram illustrating a printer 30 implementing one example of a communications system for communications between the printer controller and a replaceable printer component. Referring to FIG. 2, printer 30 includes a replaceable printer component 10 from FIG. 1, a print engine 32, a programmable power supply 34, and a controller 36 operatively connected to component 10, print engine 32, and power supply 34. In one example, component 10 is a printing material cartridge that supplies toner, ink or another printing material to print engine 32. While only one component 10 is shown, printer 30 may include multiple printing material cartridges and/or other replaceable components.

Print engine 32 represents the printer components that apply print material from a cartridge 10 to a paper or other print substrate. In a laser printer 30, for example, print engine 32 may include an imaging laser, a photoconductor, a fuser and a transport system to move the print substrate past the photoconductor and the fuser. In an inkjet printer, for another example, print engine 32 may include a printhead and a transport system to move the print substrate past the printhead. In other inkjet type microfluidic dispensing systems, print engine 32 may include a printhead array and a fixture to hold the workpiece under the array. In a 3D printer, print engine 32 may include a build material layering device, a fusing agent dispenser, and a fusing light. Some components of print engine 32 may be part of a replaceable cartridge 10. For example, in a laser printer 30, the photoconductor may be part of a replaceable toner cartridge 10. For another example, in an inkjet printer 30, the printhead may be part of a replaceable ink cartridge 10.

Printer controller 36 represents the programming, processing and associated memory resources, and the other electronic circuitry and components needed to control the operative elements of printer 30. In particular, controller 36 includes a memory 38 with authentication instructions 40 and a processor 42 to execute instructions 40. In this example, printer controller 36 communicates with device controller 14 through a two conductor bus 44 that includes a power and signal conductor 46 and a return conductor 48. An authentication process performed at the direction of printer controller 36 executing instructions 40 is described below with reference to FIG. 6.

Figure 3:
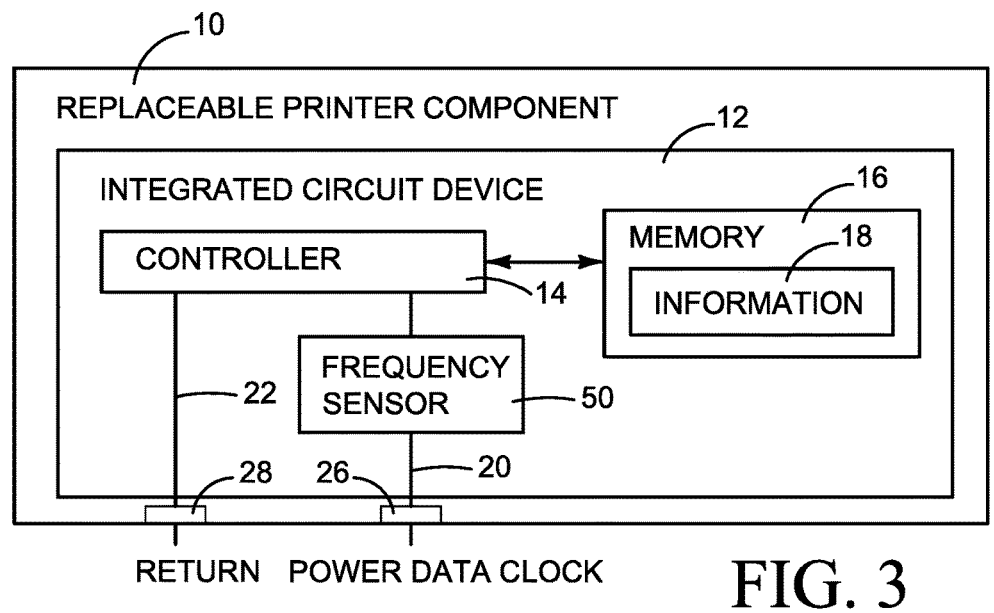
FIG. 3 is a block diagram illustrating a printing material cartridge or other replaceable printer component implementing another example of an integrated circuit device to communicate with a printer controller while the component is installed in a printer.

FIG. 3 is a block diagram illustrating a printing material cartridge or other replaceable printer component 10 implementing another example of an integrated circuit device 12 to communicate with a printer controller while the component is installed in a printer. In the example shown in FIG. 3, IC device 12 includes a frequency sensor 50 to measure or otherwise sense the frequency of a signal carried along signal conductor 20.

Figure 4:
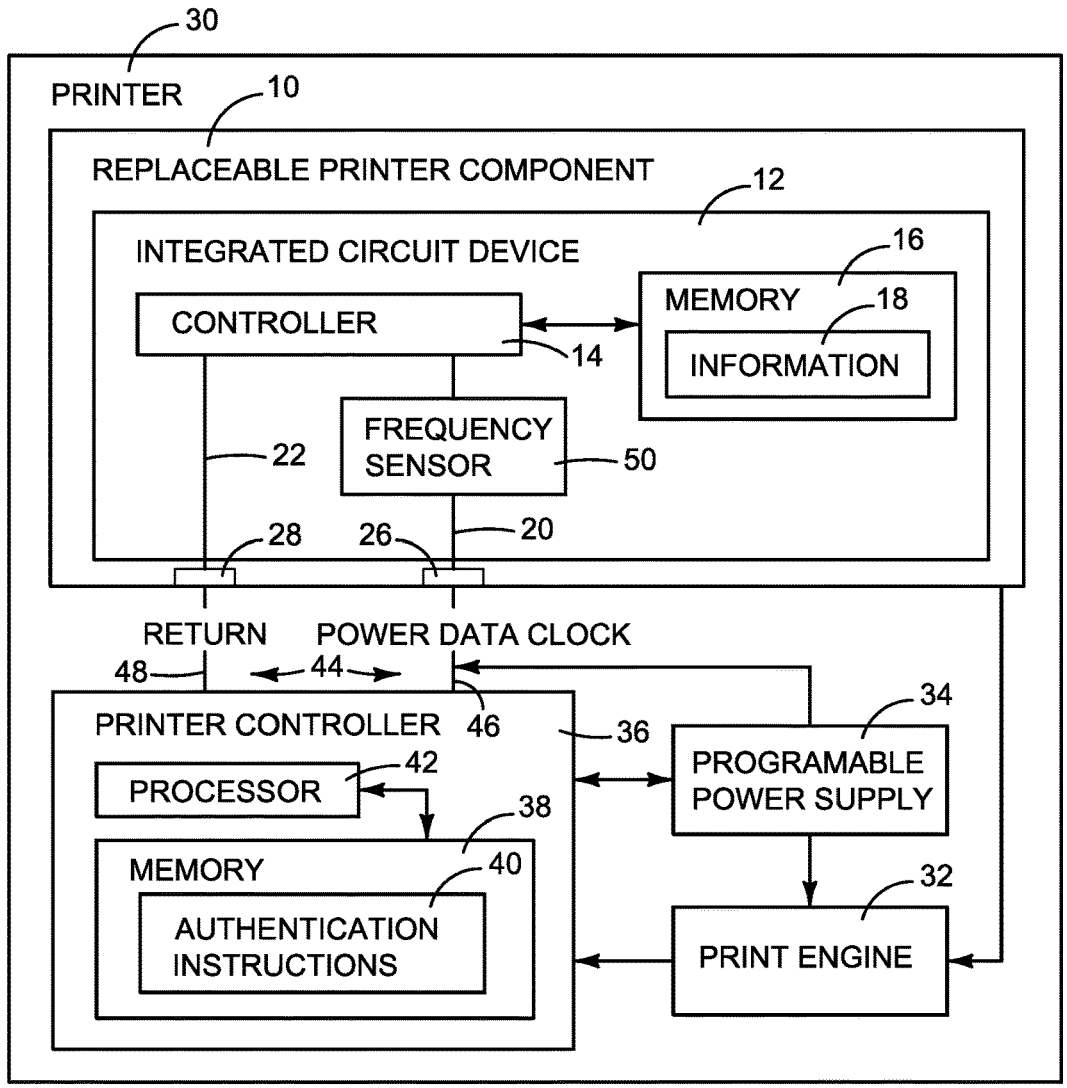
FIG. 4 is a block diagram illustrating a printer implementing one example of a communications system for communications between the printer controller and a replaceable printer component such as the component shown in FIG. 3.

The block diagram of FIG. 4 illustrates one example of a printer 30 with a replaceable component 10 from FIG. 3. In this example, where frequency sensing is used for authentication, power supply 34 in printer 30 may be implemented as a programmable or non-programmable power supply.

Figure 5:
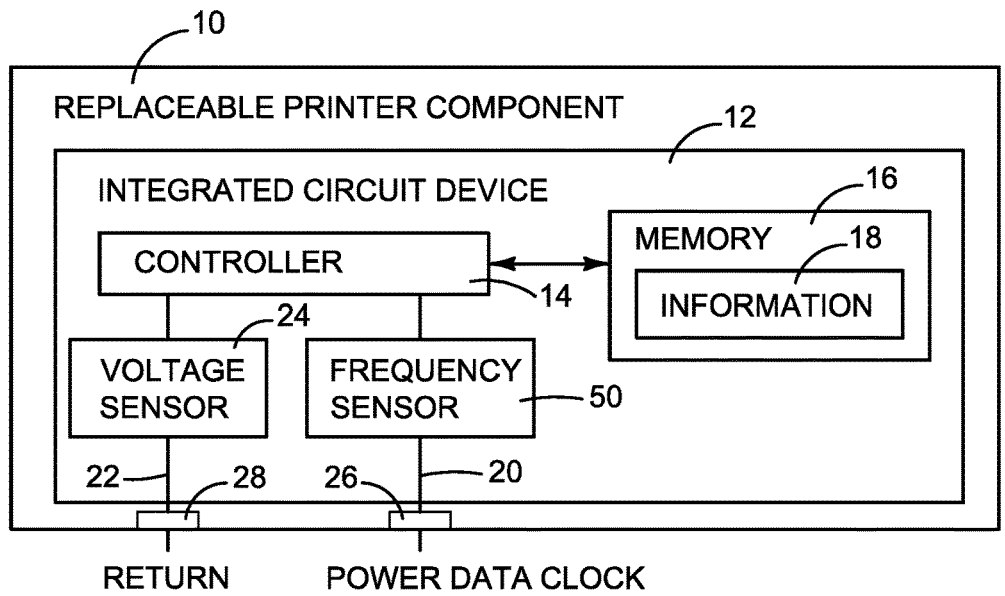
FIG. 5 is a block diagram illustrating a printing material cartridge or other replaceable printer component implementing another example of an integrated circuit device to communicate with a printer controller while the component is installed in a printer.

In the example shown in FIG. 5, component IC device 12 includes a voltage sensor 24 and a frequency sensor 50.

Figure 6:
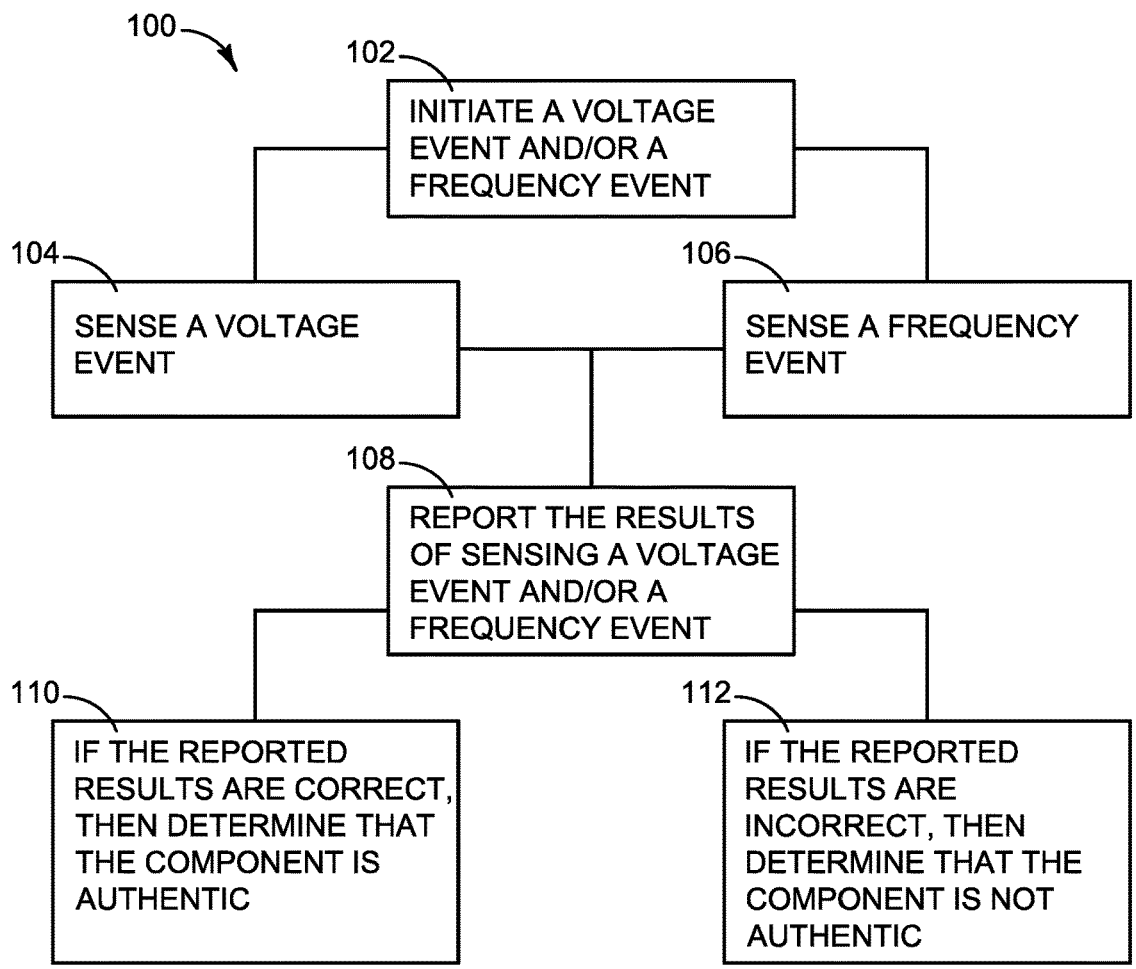
FIG. 6 is a flow diagram illustrating an example process for authenticating a replaceable printer component.

FIG. 6 illustrates an example process 100 for authenticating a replaceable printer component 10 through its integrated circuit device 12. Part numbers called out in the description of process 100 refer to the parts shown in FIGS. 1-5. Process 100 may be initiated, for example, at the direction of printer controller 36 executing authentication instructions 40. Referring to FIG. 6, printer controller 36 initiates a voltage event and/or a frequency event at block 102. A voltage event may include, for example, varying the voltage applied to power/signal conductor 46 (and thus IC device conductor 20) with a programmable power supply 34. A frequency event may include, for example, sending a data or clock signal at a communications frequency assigned to component 10 or varying the frequency of the signal within a range of frequencies sensible to IC device 12 on component 10. In one example, printer controller 36 initiates both a voltage event and a frequency event for authentication.

A voltage event, if any, is sensed by component IC device voltage sensor 24 and the results transmitted to device controller 14 (block 104). A frequency event, if any, is sensed by component IC device frequency sensor 50 and the results transmitted to device controller 14 (block 106). Device controller 14 reports the results of the sensing to printer controller 36 (block 108). If component IC device 12 reports correct results, then printer controller 36 may determine that component 10 is authentic (block 110). If component IC device 12 reports incorrect results (or there is no report), then printer controller 36 may determine that component 10 is not authentic (block 112).

In one example, measurements or other results from voltage sensor 24 and/or frequency sensor 50 are automatically reported to printer controller 36 as they are received by device controller 14 with or without a specific request or query from printer controller 36. IC device controller 14 may be programmed to report any voltage and/or frequency event and automatically report the event to printer controller 36. In another example, sensor results are logged into device memory 16 and reported periodically or when specifically requested by printer controller 36. A "request" in this context means a command, query, read operation or any other operation by printer controller 36 to obtain sensor results from IC device 12.

Figure 7:
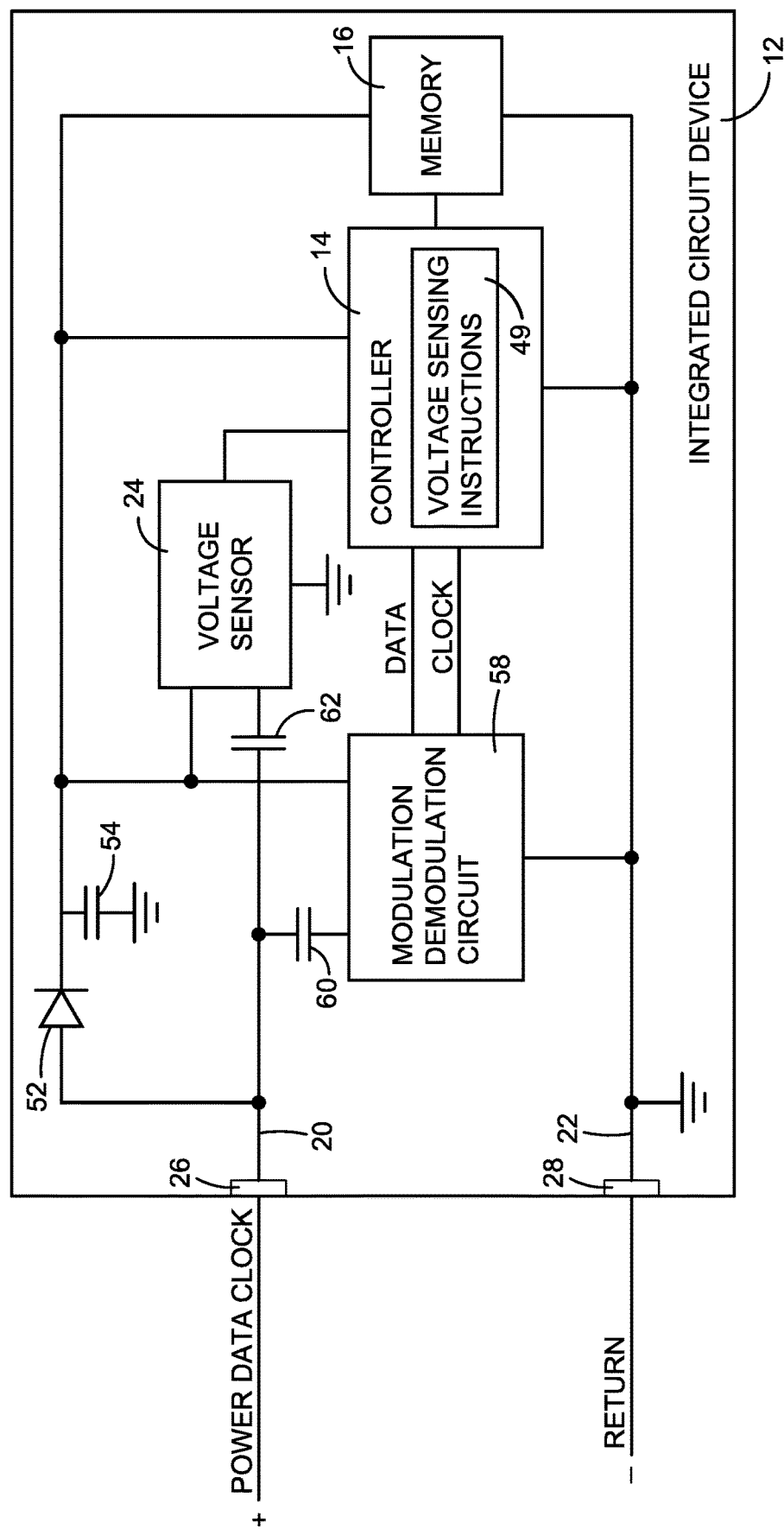
FIGS. 7 and 8 illustrate examples of an integrated circuit device such as might be used in a replaceable printer component shown in FIGS. 1 and 3, respectively, to communicate with a printer controller along a two conductor bus.
Figure 8:
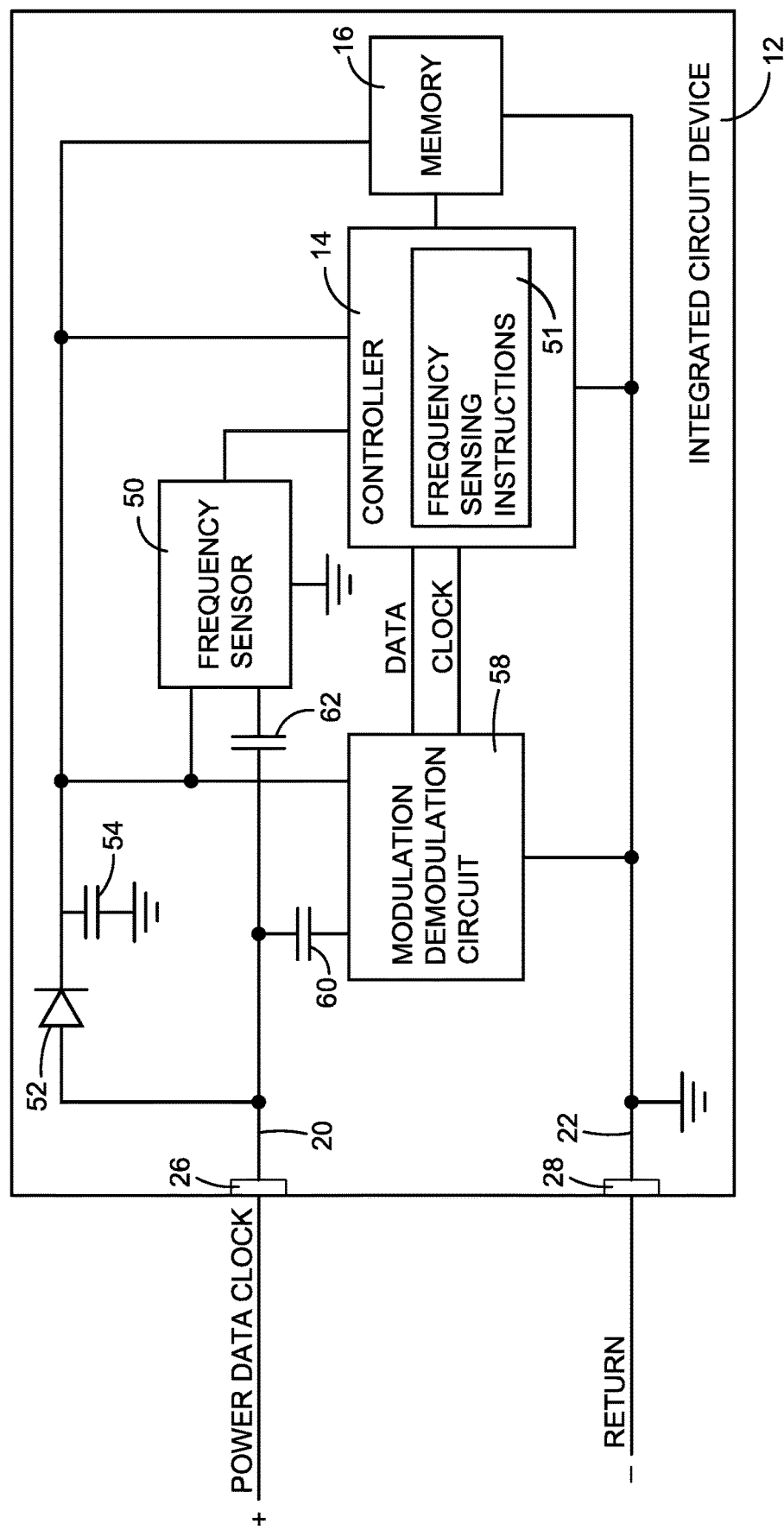

FIGS. 7 and 8 illustrate examples of an integrated circuit device 12 such as might be used in a component 10 shown in FIGS. 1 and 3, respectively, to communicate with a printer controller along a two conductor bus using frequency modulation, for example when individually addressing each of multiple printing material cartridges. Referring to FIGS. 7 and 8, power, data and clock signals are supplied to conductor 20 at contact 26. Return conductor 22 functions as a common point of reference through contact 28 to the print engine frame ground, for example, or any other suitable electrical frame of reference.

In the example shown in FIG. 7, IC device 12 includes a voltage sensor 24 to measure or otherwise sense a voltage applied to signal conductor 20. Any suitable voltage sensing circuitry may be used including, for example, an analog to digital converter block operatively connected to power/signal conductor 20. As shown in FIG. 7, a memory internal to device controller 14 may include voltage sensing instructions 49 to enable functionality in addition to responding to specific directions or requests from the printer controller. For example, voltage sensing instructions 49 may implement programming to report any voltage event and automatically report the event to the printer controller. For another example, instructions 49 may implement programming to log voltage readings into device memory 16 and report logged readings periodically or when specifically requested by the printer controller.

In the example shown in FIG. 8, IC device 12 includes a frequency sensor 50 to measure or otherwise sense the frequency of a signal carried along conductor 20. Any suitable frequency sensing circuitry may be used for sensor 50. For example, frequency sensor 50 may include a "frequency to voltage" converter whose analog output is a linear function of the frequency of the communications channel that is fed to an analog to digital converter. For another example, frequency sensor 50 may utilize the internal clock in device controller 14 as a reference to measure the frequency of the communications channel through a series of digital counting circuits. As shown in FIG. 8, a memory internal to device controller 14 may include frequency sensing instructions 51 to enable functionality in addition to responding to specific directions or requests from the printer controller. For example, frequency sensing instructions 51 may implement programming to report any frequency event and automatically report the event to the printer controller. For another example, instructions 51 may implement programming to log frequency readings into device memory 16 and reporting logged readings periodically or when specifically requested by the printer controller.

In the examples shown in FIGS. 7 and 8, power is directed to a rectifier 52 and a storage capacitor 54 to help stabilize the supply voltage to sensitive circuitry in controller 14 and memory 16, and to a signal frequency modulator and demodulator circuit 58. Capacitors 60, 62 may be used to AC couple data and clock signals to circuit 58 and voltage sensor 24 (FIG. 7) and frequency sensor 50 (FIG. 8). Modulation and demodulation circuit 58 may include, for example, a programmable filter to attenuate incoming data signals with a frequency different from the frequency associated with component 10. Circuit 58 may also include modulators and demodulators programmed with the desired modulation and demodulation methods and operating frequencies. A modulation frequency may be the same as or different from a demodulation frequency. In one example, data signals coupled to modulation and demodulation circuit 58 enable the use of a frequency chosen by the printer controller and associated with the individual component IC device 12 as a local system clock. In another example, device controller 14 includes an oscillator or a MEMS clock circuit for the local clock. Device controller 14 uses this local clock to set the desired frequency of operation for both receiving and sending data.

Figure 9:
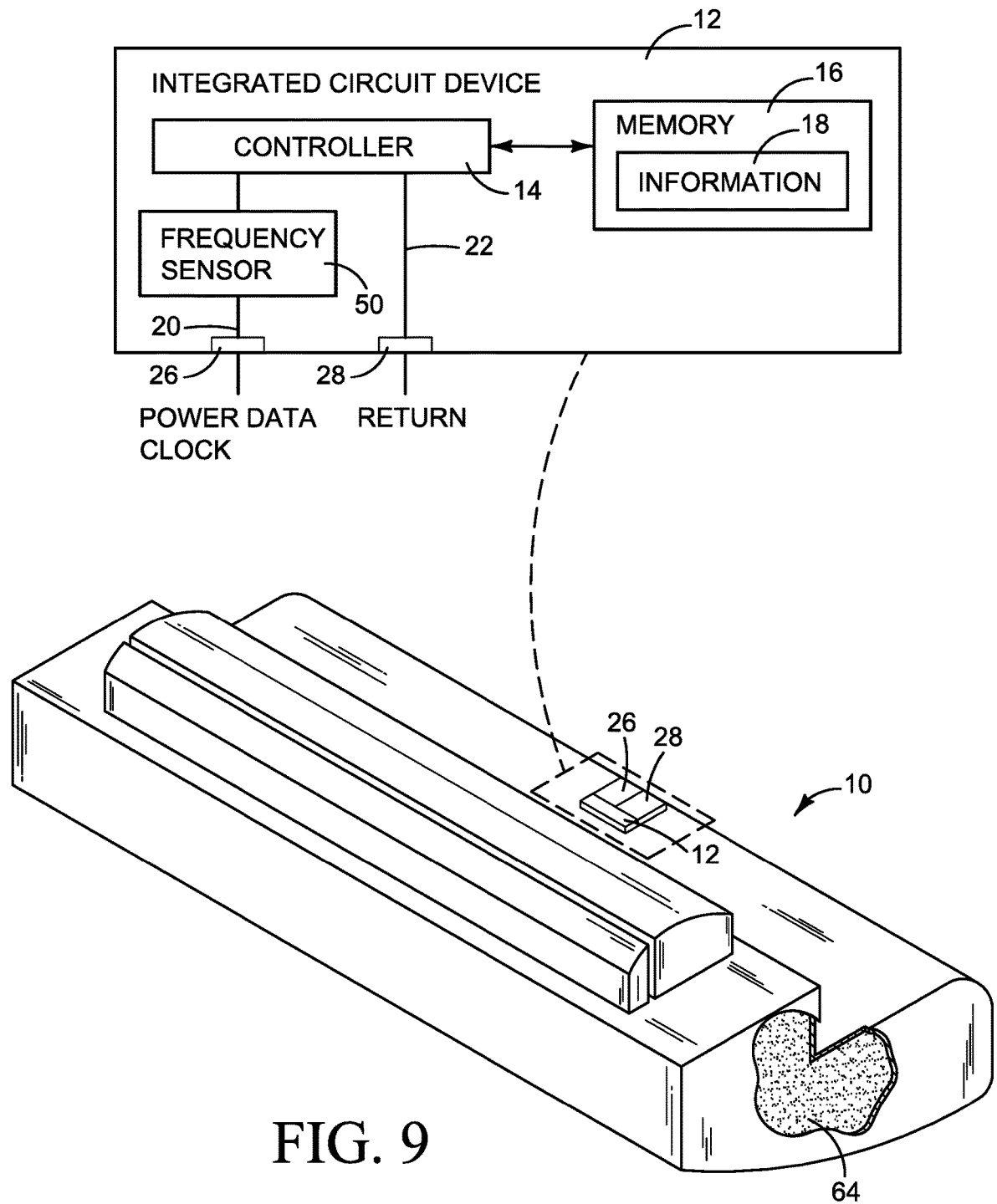
FIG. 9 illustrates one example of a toner cartridge implementing an integrated circuit device such as the one shown in FIG. 3.

In the example shown in FIG. 9, a replaceable printer component 10 in FIG. 3 is implemented as a toner cartridge 10.

Figure 10:
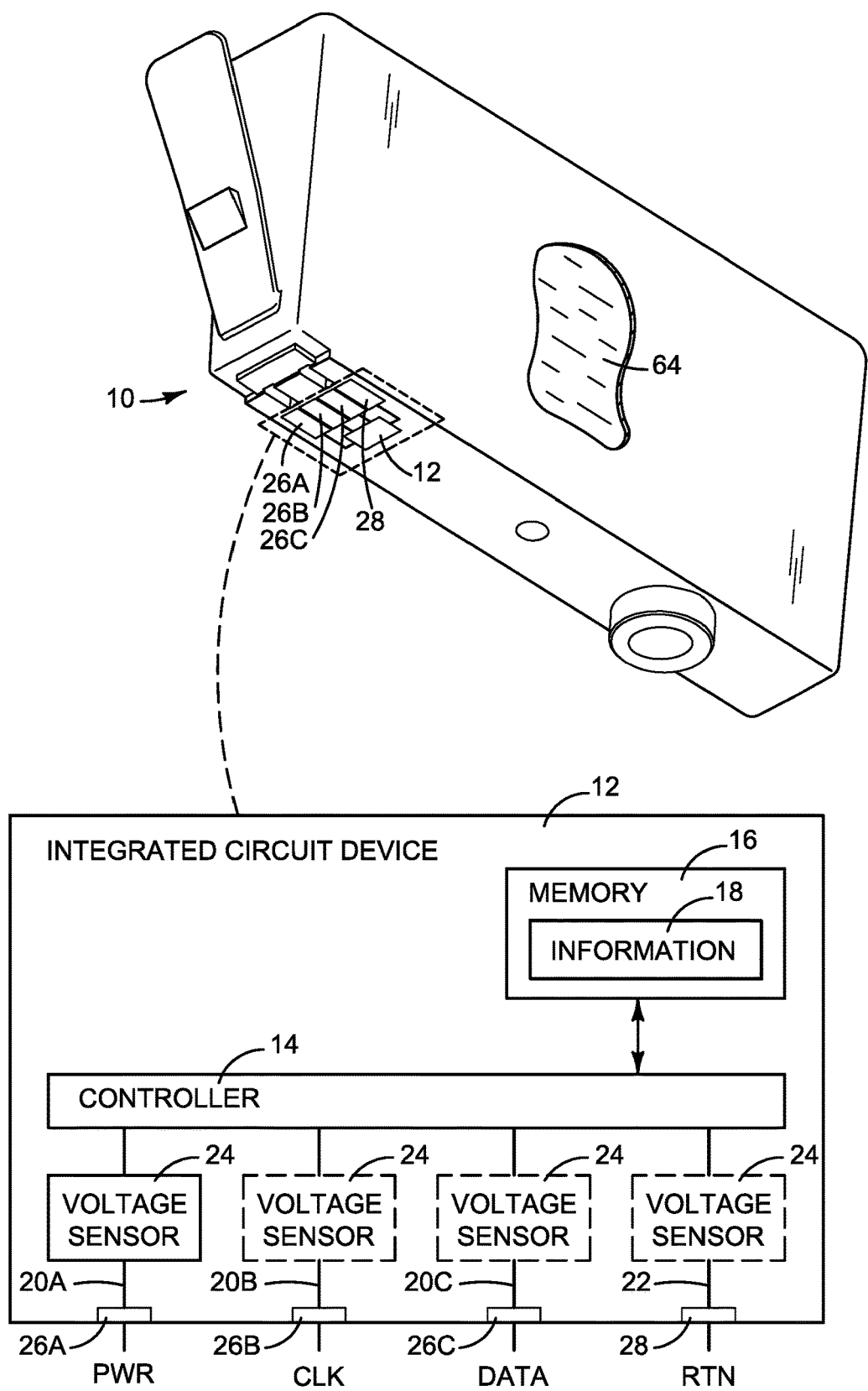
FIG. 10 illustrates one example of an ink cartridge implementing an integrated circuit device similar to device shown in FIG. 1 with a four conductor communications system.

In another example, shown in FIG. 10, a replaceable printer component is implemented as an ink cartridge 10. Ink cartridge 10 in FIG. 10 is similar to the voltage sensor implementation shown in FIG. 1 except that a four conductor communications system is used. Referring to FIG. 10, power and clock and data signals are sent on discrete conductors 20A, 20B and 20C. IC device 12 includes a voltage sensor 24 to measure or otherwise sense a voltage applied to power conductor 20A. IC device 12 may also include a voltage sensor 24 to sense a voltage applied to clock signal conductor 20B, data signal conductor 20C and/or return conductor 22, as indicated by sensors 24 in dashed lines in FIG. 10.

Information 18 residing in memory 16 for a toner cartridge 10 in FIG. 9 or an ink cartridge 10 in FIG. 10 may include, for example, information about the toner or ink in the cartridge, a digital signature or other information to authenticate the cartridge to a printer controller, and/or information to identify the cartridge to a printer controller.

Also, while a cartridge 10 will usually contain printing material while installed in a printer, a printing material cartridge 10 represents a printing material cartridge with or without printing material 64 including, for example, an empty cartridge before it is filled (or refilled) with printing material.

As noted at the beginning of this Description, the examples shown in the figures and described above illustrate but do not limit the scope of the patent. Other examples are possible. Therefore, the foregoing description should not be construed to limit the scope of the patent, which is defined in the following Claims.

"A" and "an" as used in the Claims means one or more.

The invention claimed is:

1. An article for a replaceable printer component, comprising an integrated circuit device that includes:
   a device controller;
   a single pair of conductors to supply power received from a printer controller to the device controller and to carry signals between the device controller and the printer controller; and
   a sensor operatively connected to the device controller to sense a voltage and/or a frequency on one or both of the conductors;
   wherein the device controller is to send an indication of a sensed voltage and/or a sensed frequency to the printer controller.

2. The article of claim 1, wherein the indication includes the sensed voltage and/or the sensed frequency.

3. The article of claim 1, wherein the sensor comprises a voltage sensor to sense a voltage on a power supply conductor, a return conductor, and/or a signal conductor.

4. The article of claim 1, wherein the sensor comprises a frequency sensor to sense a frequency of a clock signal on a signal conductor.

5. The article of claim 1, wherein the sensor comprises a frequency sensor to sense a frequency of a data signal and/or a clock signal on a signal conductor.

6. The article of claim 1, wherein the device controller is to:
   log voltages and/or frequencies sensed by the sensor; and
   send logged voltages and/or frequencies to the printer controller.

7. The article of claim 1, wherein the integrated circuit device includes a memory operatively connected to the device controller to generate and/or store information about a printing material held or to be held in the container, information to authenticate the printing material cartridge to a printer controller, and/or information to identify the printing material cartridge to a printer controller.

8. The article of claim 1, wherein the integrated circuit device is a single integrated circuit device.

9. An integrated circuit device for a printing material cartridge, comprising:
   a device controller;
   a memory operatively connected to the device controller to store and/or generate information about the cartridge;
   multiple conductors to supply power from a printer controller to the device controller and to carry signals between the device controller and the printer controller;
   a sensor operatively connected to the device controller to sense a voltage and/or a frequency on one of the conductors in the single pair of conductors; and multiple electrical contacts each connected to one of the conductors to connect the integrated circuit device to the printer controller while the cartridge is installed in a printer;

wherein the device controller is to send a sensed voltage and/or a sensed frequency to the printer controller, and wherein the conductors include a single pair of conductors to supply power from the printer controller to the device controller and to carry signals between the device controller and the printer controller.

10. The device of claim 9, wherein the sensor comprises a voltage sensor to sense a voltage of a power supply signal, a data signal, and/or a clock signal.

11. The device of claim 9, wherein the sensor comprises a frequency sensor to sense a frequency of a data signal and/or a clock signal.

12. The device of claim 9, wherein the memory is operatively connected to the controller to generate and/or store information about printing material in the cartridge, information to authenticate the cartridge to a printer controller, and/or information to identify the cartridge to a printer controller.

13. The device of claim 9, wherein the printing material cartridge is a toner cartridge.

14. The device of claim 9, wherein the printing material cartridge is an ink cartridge and the conductors include a first conductor to supply power to the controller, a second conductor to carry data signals between to the device controller and a printer controller, a third conductor to carry clock signals between the device controller and the printer controller, and a fourth conductor to function as a common point of reference.

15. A non-transitory computer readable medium having instructions thereon for authenticating a replaceable printer component including an integrated circuit device, the non-transitory computer readable medium comprising:

instructions to receive power from a printer controller and to supply the received power to a device controller of the integrated circuit device, the power received by a single pair of conductors that are further to carry signals between the device controller and the printer controller;

instructions to sense a voltage and/or a frequency on one or both of the conductors; and instructions to send an indication of a sensed voltage and/or a sensed frequency to the printer controller.

16. The non-transitory computer readable medium 15, wherein the instructions to send the indication include instructions to send the sensed voltage and/or the sensed frequency.

17. The non-transitory computer readable medium 15, wherein the instructions to sense a voltage and/or a frequency on one or both of the conductors include instructions to sense a voltage on a power supply conductor, a return conductor, and/or a signal conductor.

18. The non-transitory computer readable medium 15, wherein the instructions to sense a voltage and/or a frequency on one or both of the conductors include instructions to sense a frequency of a clock signal on a signal conductor.

19. The non-transitory computer readable medium 15, wherein the instructions to sense a voltage and/or a frequency on one or both of the conductors include instructions to sense a frequency of a data signal and/or a clock signal on a signal conductor.

20. The non-transitory computer readable medium 15, further comprising:

instructions to log sensed voltages and/or frequencies; and instructions to send logged voltages and/or frequencies to the printer controller.

* * * * *